United States Patent

Mugiya et al.

[11] Patent Number: 5,841,924
[45] Date of Patent: Nov. 24, 1998

[54] OPTICAL APPARATUS HAVING A FERRULE HOLDER, A LENS HOLDER AND AN OPTICAL SEMICONDUCTOR DEVICE PACKAGE HOLDER

[75] Inventors: Hiroshi Mugiya; Kouichi Iwaida, both of Kawasaki, Japan

[73] Assignee: Fujitsu Limited, Kawasaki, Japan

[21] Appl. No.: 845,152

[22] Filed: Apr. 21, 1997

[30] Foreign Application Priority Data

Nov. 11, 1996 [JP] Japan ..................................... 8-298987

[51] Int. Cl.⁶ ............................... G02B 6/00; G02B 6/36
[52] U.S. Cl. ............................................................ 385/93
[58] Field of Search ........................... 385/88–90, 91–94, 385/51, 52; 372/36; 257/432, 98

[56] References Cited

U.S. PATENT DOCUMENTS

| | | | |
|---|---|---|---|
| 5,028,111 | 7/1991 | Yumoto et al. | 385/51 |
| 5,033,052 | 7/1991 | Masuko et al. | 372/36 |
| 5,572,615 | 11/1996 | Emori | 385/92 |
| 5,663,821 | 9/1997 | Suda et al. | 359/152 |
| 5,675,685 | 10/1997 | Fukuda et al. | 385/89 |

*Primary Examiner*—Akm E. Ullah
*Attorney, Agent, or Firm*—Armstrong, Westerman, Hattori, McLeland & Naughton

[57] ABSTRACT

An optical apparatus has a protecting tube made of rubber or resin, a ferrule holder in which a ferrule connected with an optical fiber cable passing through a cable inserting hole of the protecting cap is held, a lens holder fixed to the ferrule holder, a package holder fixed to the lens holder, a protecting tube in which the ferrule holder, the lens holder and the package holder are tightly set, and a flange placed on one end of the protecting tube. An optical axis of the optical fiber cable, an optical axis of a lens held in the lens holder and an optical axis of an optical semiconductor device which is packed in a device package held in the package holder agree with a common optical axis of the optical apparatus. The protecting tube is formed by rolling up a metal plate, and the protecting tube and the flange are integrally formed. A base body of the device package face the protecting tube through an open space, so that any stress applied to the flange is not influenced on the optical semiconductor device, and the optical axes do not shift from the common axis. Also, because the protecting cap is soft and elastic, an external shock applied to the optical fiber cable is absorbed by the protecting cap, so that the optical fiber cable is not damaged.

11 Claims, 7 Drawing Sheets

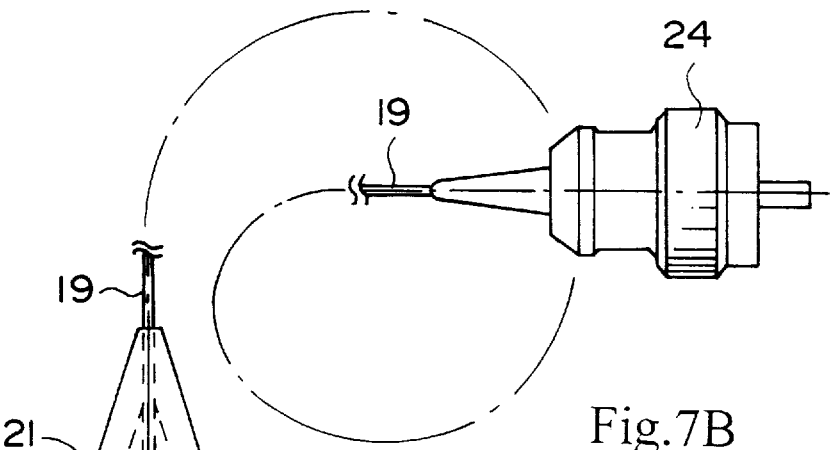
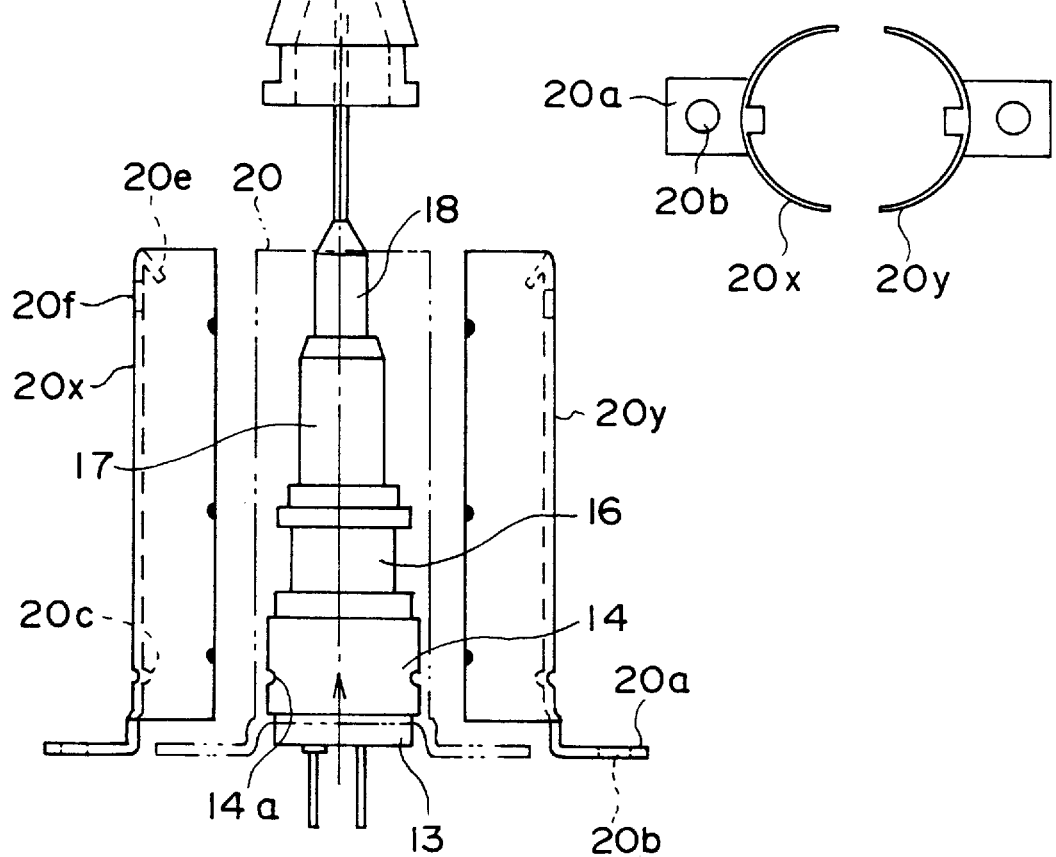
Fig.7A
Fig.7B

OPTICAL APPARATUS HAVING A FERRULE HOLDER, A LENS HOLDER AND AN OPTICAL SEMICONDUCTOR DEVICE PACKAGE HOLDER

BACKGROUND OF THE INVENTION

1. Field of the Invention

The present invention relates generally to an optical apparatus, and more particularly to an optical apparatus obtained by optically connecting an optical fiber and an optical semiconductor device.

2. Description of the Prior Art

As an optical module having an optical semiconductor device and an optical fiber optically connected with each other, a coaxial type optical apparatus shown in FIG. 1 is, as an example, known.

The coaxial type optical apparatus shown in FIG. 1 has an optical fiber cable 1, a ferrule 2 to which the optical fiber cable 1 is attached, a cylindrical ferrule holder 3 for supporting the ferrule 2, a lens holder 4, a condensing lens 5 tightly fit in the lens holder 4, a device package 6 made of metal, an optical semiconductor device 7 airtightly sealed in the device package 6, a package holder 8 for supporting the device package 6, and a flange 9 welded to a peripheral portion of the package holder 8.

As the optical semiconductor device 7, a light emitting device such as a semiconductor laser or a photodiode or a light detecting device is, for example, used.

A light transmitting hole 8a is opened on one end of the package holder 8, and an opening portion 8b is arranged on the other end of the package holder 8 to expose a lead pin 6a of the device package 6.

An optical system including the lens holder 4 and the condensing lens 5 is arranged to enhance a coupling efficiency determined by a degree of the alignment between an optical axis of a top portion of the ferrule 2 and an optical axis of the light emitting (or detecting) device. Therefore, after a particular positional relationship in which an efficiency of a photo-coupling among the condensing lens 5, the ferrule 2 and the optical semiconductor device 7 is maximized is examined, the condensing lens 5, the ferrule 2 and the optical semiconductor device 7 are welded by a resistance welding or a YAG laser to keep the particular positional relationship.

The condensing lens 5, the ferrule 2 and the optical semiconductor device 7 are fixed according to a following procedure.

The device package 6 in which the optical semiconductor device 7 is airtightly sealed and a light transmitting window 6b is arranged is prepared, and the device package 6 is tightly fit in the package holder 8. Thereafter, an outside portion of the device package 6 and an inside portion of the package holder 8 are fixedly attached to each other by resister-welding the outside and inside portions together at a plurality of welding points. Thereafter, one end portion of the package holder 8 and one end portion of the lens holder 4 are welded together at a plurality of welding points by the YAG laser radiation. This welding is performed on condition that the optical axis of the condensing lens 5 almost agrees with the optical axis of the optical semiconductor device 7.

Thereafter, the ferrule 2 to which the optical fiber cable 1 is attached is temporarily arranged on the condensing lens 5. Thereafter, a positional relationship between the optical semiconductor device 7 and the optical fiber cable 1 is adjusted by an optical fiber cable alignment while emitting and detecting light between the optical semiconductor device 7 and the optical fiber cable 1, and a peak value of the optical coupling efficiency between the optical semiconductor device 7 and the optical fiber cable 1 is obtained. When the peak value is determined, one end portion of the ferrule holder 3 in which the ferrule 2 is fixedly inserted is welded to one end portion of the lens holder 4 by the YAG laser at a plurality of welding points, and the positions of the ferrule holder 3 and the lens holder 4 are fixed to maintain the positional relationship between the optical semiconductor device 7 and the optical fiber cable 1 on condition the optical coupling efficiency is set to the peak value.

Therefore, the ferrule holder 3, the lens holder 4 and the package holder 8 are resister-welded or welded by the YAG laser in that order to be fixed, and the ferrule holder 3, the lens holder 4 and the package holder 8 are covered with a cylindrical cap 10 made of rubber or resin. Also, a conical portion 10a is formed on one end of the cap 10, and a cable inserting hole 10b is formed on a top end of the conical portion 10a to insert the optical fiber cable 1 into the cap 10. Because the ferrule holder 3, the lens holder 4 and the package holder 8 are covered with the cap 10 having elasticity, the optical fiber cable 1 is protected from an external mechanical stress.

In FIG. 1, a reference sign 9a indicates a screw stopping hole formed in the flange 9, a reference sign L indicates an optical axis. Also, a black dot indicates a welding point.

However, in the above configuration of the optical apparatus, the welding points respectively connecting the package holder 8 and the flange 9 are placed on a side portion of the package holder 8 at which the device package 6 and the package holder 8 are welded together. Therefore, when the flange 9 is subjected to stress, the device package 6 and/or the package holder 8 are distorted, and each welding point connecting the device package 6 and the package holder 8 is subjected to stress.

For example, in cases where a ground object screwed to the flange 9 has an uneven surface, when a screw penetrating through the screw stopping hole 9a is fastened to screw the ground object to the flange 9, the flange 9 is subjected to stress. In this case, the device package 6 and/or the package holder 8 are distorted, each welding point connecting the device package 6 and the package holder 8 is subjected to stress, the positional relationship among the optical fiber cable 1, the condensing lens 5 and the optical semiconductor device 7 is adversely influenced, optical axes of the optical fiber cable 1, the condensing lens 5 and the optical semiconductor device 7 shift, and the photo-coupling efficiency is undesirably lowered before the optical apparatus is shipped.

Also, when the flange 9 is subjected to stress, the elastic cap 10 covering the optical semiconductor device 7, the condensing lens 5 and the ferrule 2 are curved toward an X-Y-θ direction shown in FIG. 2A by an external mechanical stress applied to the optical fiber cable 1 in a lateral direction. The optical axes of the optical fiber cable 1 arranged in the ferrule 2, the condensing lens 5 and the optical semiconductor device 7 covered with the cap 10 shift, so that there is a drawback that the photo-coupling efficiency is lowered.

The positional shift of the optical axes of the optical fiber cable 1, the condensing lens 5 and the optical semiconductor device 7 is shown in FIGS. 2B to 2D.

A normal condition of the optical axes of the ferrule 2, the condensing lens 5 and the optical semiconductor device 7 is shown in FIG. 2A. When an external stress damage is applied to the device package 6, the axis of the optical semiconductor device 7 shifts, and FIG. 2B shows an undesired condition that light emitted from the optical semiconductor device 7 is not received by the optical fiber cable 1 because of the positional shift of the axis of the optical semiconductor device 7. When an external stress damage is applied to the condensing lens 5, the axis of the condensing lens 5 shifts, and FIG. 2C shows an undesired condition that light emitted from the optical semiconductor device 7 is not received by the optical fiber cable 1 because of the positional shift of the axis of the condensing lens 5. When an external stress damage is applied to the optical fiber cable 1, the axis of the optical fiber cable 1 shifts, and FIG. 2D shows an undesired condition that light emitted from the optical semiconductor device 7 is not received by the optical fiber cable 1 because of the positional shift of the optical fiber cable 1.

SUMMARY OF THE INVENTION

An object of the present invention is to provide, with due consideration to the drawbacks of such a conventional optical apparatus, an optical apparatus in which the degradation of the photo-coupling efficiency caused by the shift of optical axis of parts of the optical apparatus because of a change of a positional relationship among parts of the optical apparatus is suppressed.

In the present invention, a holder in which a portion of an optical fiber cable, a lens and an optical semiconductor device package are held is arranged in a protecting tube, and the protecting tube is formed by making round a metal plate into a tube. Also, a flange screwed to the protecting tube is formed by curving a metal plate.

Because it is difficult to curve the protecting tube made of the metal plate, an external stress applied to the holder through the protecting tube is reduced, the shift of optical axis of the optical fiber cable, the lens and an optical semiconductor device is suppressed.

Also, the flange is integrally formed with the protecting tube by pressing a metal plate and forming the flange and the protecting tube out of the metal plate. Therefore, the number of parts in the optical apparatus can be reduced.

Also, an elastic cap is attached to the protecting tube, and the optical fiber cable penetrates through a hole of the elastic cap. Therefore, even though an external stress directed in a radial direction of the protecting tube is applied to the optical fiber cable, the elastic cap is deformed to absorb and disperse the external stress, so that it is prevented that the optical fiber cable is curved sharp. Therefore, the damage of the optical fiber cable occurring at a contacting point between the elastic cap and the optical fiber cable can be considerably suppressed.

Also, an open area is formed between a portion of the protecting tube placed in the neighborhood of the flange and the optical semiconductor device package. Therefore, when the flange is screwed to a ground object, even though a surface of the ground object is uneven, there is no probability that a stress is applied to the optical semiconductor device package through the flange and the protecting tube. Therefore, it is prevented that the position of the optical semiconductor device packed in the optical semiconductor device package is changed when the flange is screwed to the ground object. That is, the shift of optical axis of the optical fiber cable, the lens and an optical semiconductor device can be prevented.

Also, a welding point connecting the protecting tube and the holder is arranged to be far from the optical semiconductor device package. Therefore, a shift of the optical axis of the optical semiconductor device packed in the optical semiconductor device package can be prevented. Also, a hole of the protecting tube is formed in advance, and the welding point is placed in the hole. Therefore, the protecting tube and the holder can be reliably connected with each other, and a welding strength at the welding point can be heightened.

Also, a concave portion is formed in the periphery of the holder, a convex portion is formed on the inside of the protecting tube, and the convex portion of the protecting tube is tightly fit in the concave portion of the holder. Therefore, a shift of the protecting tube in its height direction or its side direction can be prevented.

Also, a window is arranged on a side of the protecting tube, a convex portion is arranged on the bottom of the cap, and the convex portion of the cap is tightly fit in the window of the protecting tube from the inside of the protecting tube. Therefore, it is prevented that the cap attached to the protecting tube is detached from the protecting tube. In this case, a nail portion having an inclined plane is formed on the end of the protecting tube by folding back the end portion of the protecting tube toward the inside of the protecting tube, and the convex portion of the cap inserted into the window of the protecting tube is positioned by the nail portion of the protecting tube. Therefore, the cap can be easily connected with the protecting tube because the nail portion of the protecting tube leads the convex portion of the cap into the window of the protecting tube, and the nail portion of the protecting tube prevents that the cap connected with the protecting tube is detached from the protecting tube.

Also, both end portions of the metal plate used to form the protecting tube are faced each other through an open area at a joint-line space of the protecting tube, and the open area is widened when the optical fiber cable is inserted into the protecting tube. Therefore, the optical fiber cable can be easily and tightly inserted into the protecting tube. Also, the protecting tube can be easily attached to the holder on condition that a connecter is connected with the optical fiber cable.

Also, in cases where both end portions of the metal plate used to form the protecting tube are overlapped at the joint-line space of the protecting tube, a diameter of the protecting tube can be easily adjusted by adjusting an overlapping degree of the both end portions of the metal plate.

Also, in cases where a tongue-like projecting portion of the protecting tube and a tongue-like opening area of the protecting tube are formed at the joint-line space of the protecting tube and the tongue-like projecting portion is fit into the tongue-like opening area, a width at the joint-line space of the protecting tube can be easily set, and a diameter of the protecting tube can be easily set.

BRIEF DESCRIPTION OF THE DRAWINGS

FIG. 7A is a side view showing an assembling condition of a protecting tube of an optical apparatus according to a third embodiment of the present invention.

FIG. 7B is a top view of the protecting tube shown in FIG. 6A.

DESCRIPTION OF THE PREFERRED EMBODIMENTS

Preferred embodiments of an optical apparatus according to the present invention are described with reference to drawings.
(First embodiment)

Figure 1:
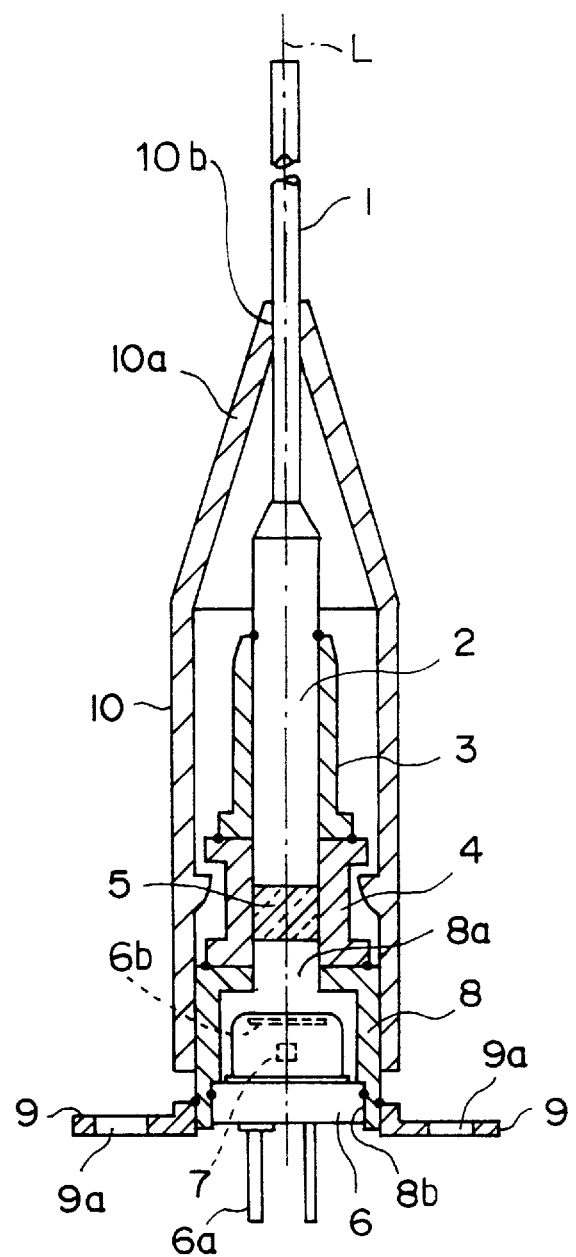
FIG. 1 is a cross sectional view of a conventional optical apparatus.
Figure 2A:
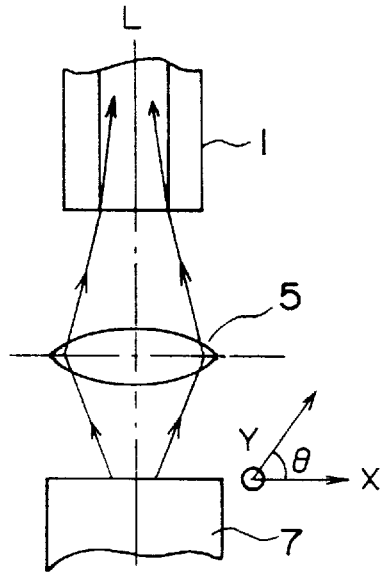
FIG. 2A is a side view of a combination of an optical semiconductor device, a lens and an optical fiber cable arranged in a conventional optical apparatus to indicate a normal condition of optical axis of the optical semiconductor device, the lens and the optical fiber cable.
Figure 2B:
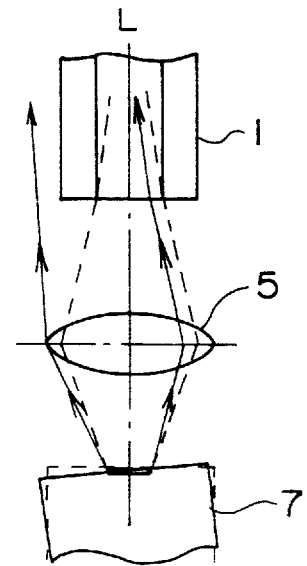
FIG. 2B is a side view of the combination of the optical semiconductor device, the lens and the optical fiber cable arranged in the conventional optical apparatus to indicate an undesired condition that light emitted from the optical semiconductor device is not detected by the optical fiber cable 1 because the axis of the optical semiconductor device shifts.
Figure 2C:
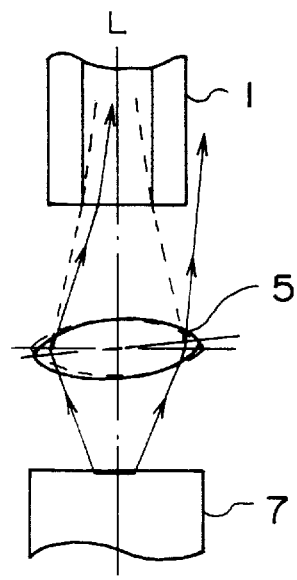
FIG. 2C is a side view of the combination of the optical semiconductor device, the lens and the optical fiber cable arranged in the conventional optical apparatus to indicate an undesired condition that light emitted from the optical semiconductor device is not detected by the optical fiber cable 1 because the axis of the lens shifts.
Figure 2D:
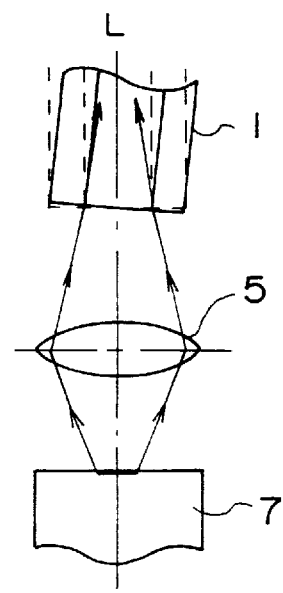
FIG. 2D is a side view of the combination of the optical semiconductor device, the lens and the optical fiber cable arranged in the conventional optical apparatus to indicate an undesired condition that light emitted from the optical semiconductor device is not detected by the optical fiber cable 1 because the axis of the optical fiber cable shifts.
Figures 1, 3A:
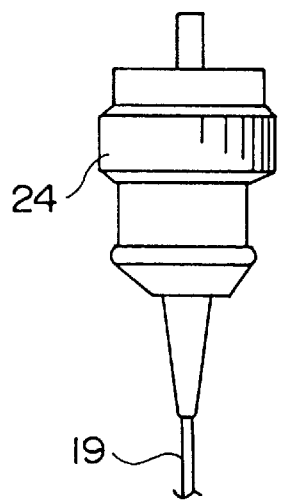
FIG. 3A is a cross sectional view of an optical apparatus according to a first embodiment of the present invention.

FIG. 3A is a cross sectional view of an optical apparatus according to a first embodiment of the present invention.

An optical apparatus 11 shown in FIG. 3A comprises a device package 13 made of metal in which an optical semiconductor device 12 such as a light detecting device or a light emitting device is airtightly accommodated. A lead pin 13b electrically connected with the optical semiconductor device 12 is projected from an end of a base body 13a of the device package 13. Also, a light transmitting window 13d in which a light transmitting part such as glass or a lens is tightly fit is arranged on a light transmitting side of a cap 13c of the device package 13, so that an inside area of the device package 13 is maintained to an airtight condition.

A package holder 14 made of stainless steel or Fe—Ni alloy, in which the cap 3c of the device package 13 is inserted, is formed in a cylindrical shape and has a light transmitting hole 14b at its end. An inside diameter of the package holder 14 at the other end is smaller than an outside diameter of the base body 13a of the device package 13, and an outside diameter of the package holder 14 at the other end is larger than the outside diameter of the base body 13a of the device package 13. Also, one or more concave portions 14a are formed in an outer circumferential surface of the package holder 14.

A lens holder 16, which is made of stainless steel or Fe—Ni alloy and is formed in a cylindrical shape, is arranged on the package holder 14, and a condensing lens 15 is tightly fit in the lens holder 16. A ferrule holder 17, which is made of stainless steel or Fe-Ni alloy and is formed in a cylindrical shape, is arranged on the lens holder 16. A ferrule 18 made of metal, ceramic or resin is inserted into the ferrule holder 17 and is formed so as to support one end of an optical fiber cable 19.

A procedure for assembling the optical apparatus 11 is described.

The cap 13c of the device package 13 is tightly fit in the package holder 14. Thereafter, the base body 13a of the device package 13 and an end plane of the package holder 14 are resistance-welded or laser-welded together at a plurality of welding points to fixedly attach the device package 13 to the package holder 14. Thereafter, the periphery of the package holder 14 and one peripheral end portion of the lens holder 16 are welded together at a plurality of welding points by using a YAG laser. This welding is performed on condition that an optical axis of the condensing lens 15 agrees with an optical axis of the optical semiconductor device 12.

Thereafter, the ferrule 18 to which the optical fiber cable 19 is attached is temporarily arranged on the lens holder 16. Thereafter, a positional relationship between the optical semiconductor device 12 and the optical fiber cable 19 is adjusted by an optical fiber cable alignment (not shown) while light is emitted and detected between the optical semiconductor device 12 and the optical fiber cable 19 through the condensing lens 15, an efficiency of an optical coupling between the optical semiconductor device 12 and the optical fiber cable 19 is examined, and a peak value of the optical coupling efficiency is obtained when the optical semiconductor device 12 and the optical fiber cable 19 are set to a particular positional relationship.

Thereafter, an end portion of the ferrule holder 17 and an end portion of the lens holder 16 are welded together at a plurality of welding points by the YAG laser on condition that the optical semiconductor device 12 and the optical fiber cable 19 are set to the particular positional relationship and the optical coupling efficiency is equal to the peak value.

As is described above, after the package holder 14, the lens holder 16 and the ferrule holder 17 are fixed to each other by performing the resistance-welding or the YAG laser welding, a set of the package holder 14, the lens holder 16 and the ferrule holder 17 is inserted into the protecting tube 20 and is fixed in the protecting tube 20. Also, a portion of the ferrule 18 and a portion of the optical fiber cable 19 projected from the protecting tube 20 are covered with a protecting cap 21. The protecting cap 21 is made of resin or rubber, so that the protecting cap 21 is flexible and elastic.

Figure 4A:
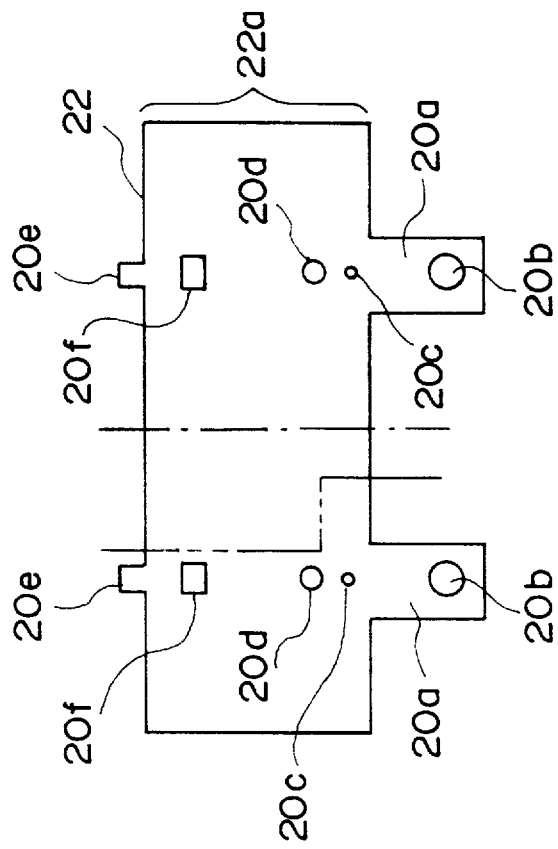
FIG. 4A is an expansion plan view of a protecting tube of the optical apparatus according to the first embodiment of the present invention.

As shown in FIG. 4A, the protecting tube 20 is formed by curving a processed plate 22 obtained by cutting out a metal plate which is made of metal such as stainless steel or Fe—Ni alloy and has a thickness ranging from 0.1 to 1.0 mm. To prevent the oxidation of the processed plate 22 or to prevent the processed plate 22 being rusted, a surface of the processed plate 22 is nickel-plated, if necessary.

The processed plate 22 has a rectangular portion 22a of 25 mm by 20 mm used as a body of the protecting tube 20. Also, a pair of flanges 20a are projected from a first side of the rectangular portion 22a, and a screw hole 20b is formed in each of the flanges 20a. A pair of convex portions 20c planned to be fit in the concave portions 14a of the package holder 14 are arranged on the rectangular portion 22a to be placed in the neighborhood of the flanges 20a. The convex portions 20c are formed by a press working, and a diameter of each convex portion 20c ranges from 0.5 to 2 mm. Also, a pair of welding holes 20d are opened in the rectangular portion 22a to be placed in the neighborhood of the convex portions 20c. The welding holes 20d are formed by a punching to reliably heighten a welding strength between the protecting tube 20 and each holder 14, 16 or 17. Also, a pair of nail portions 20e formed in a U shape are projected from a second side of the rectangular portion 22a opposite to the first side of the rectangular portion 22a. Also, a pair of small windows 20f are opened in the rectangular portion 22a to be placed in the neighborhood of the nail portions 20e. The small windows 20f are formed by a punching.

To use the processed plate 22 as the protecting tube 20, the pair of flanges 22a are bent toward one side of the rectangular portion 22a, on which the convex portions 20c are not arranged, at an angle of about 90 degrees, and the processed plate 22 are rolled up to place the convex portions 20c on the inside of the processed plate 22. Therefore, a body of the protecting tube 20 is formed. Thereafter, the pair of nail portions 20e are turn in toward the inside of the protecting tube 20 at an angle more than 90 degrees on condition that each nail portion 20e does not contact with an inner surface of the protecting tube 20.

Because the protecting tube 20 is formed by rolling up the processed plate 22, a joint-line region 20g extending in a height direction of the protecting tube 20 necessarily exist. The punching of the processed plate 22, the rolling-up of the processed plate 22 and the bending of the processed plate 22 are performed by a press working.

In the above configuration of the protecting tube 20, when the optical fiber cable 19 attached to the ferrule 18 is placed in the protecting tube 20 and the protecting tube 20 is moved to cover the ferrule 18, the ferrule holder 17, the lens holder 16 and the package holder 14 with the protecting tube 20, the convex portions 20c of the protecting tube 20 contact with an upper end of the package holder 14. Thereafter, when the protecting tube 20 is moreover moved toward the device package 13, an open space of the joint-line region 20g of the protecting tube 20 is widened by the package holder 14 to place the convex portions 20c of the protecting tube 20 on an outer surface of the package holder 14. Thereafter, as shown in FIG. 3A, the convex portions 20c of the protecting tube 20 are fit in the concave portions 14a of the package holder 14, and the joint-line region 20g of the protecting tube 20 is narrowed.

Therefore, when the convex portions 20c of the protecting tube 20 are fit in the concave portions 14a of the package holder 14, the movement of the protecting tube 20 in the upper and lower directions and the rotation of the protecting tube 20 around the optical axis L of the optical apparatus 11 are forbidden. In this condition, the base body 13a of the package 13 is spaced by a distance ranging from 0.2 to 1.0 mm from the protecting tube 20 placed around the package 13 through an open space 23. To widen the open space 23, it is preferred that a diameter of a bottom portion of the protecting tube 20 placed in the neighborhood of the flanges 20a be widened by bending the bottom portion of the protecting tube 20 toward an outer direction opposite to a projecting direction of the convex portions 20c.

As is described above, the work for attaching the protecting tube 20 to the package holder 14 is completed.

Thereafter, the side portion of the protecting tube 20 and the outer surface of the package holder 14 are welded together by radiating YAG laser light to the outer surface of the package holder 14 through the welding holes 20d.

Figure 4B:
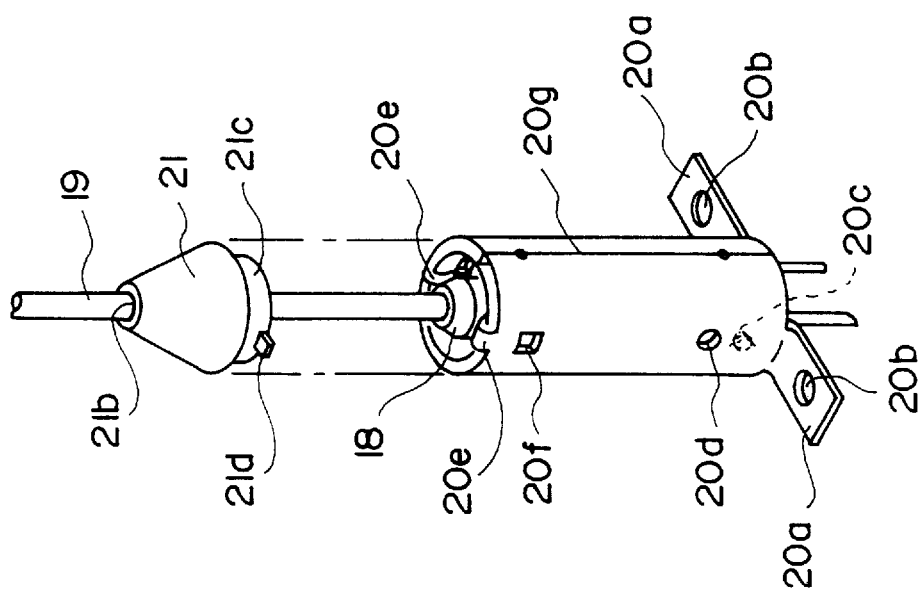
FIG. 4B is a diagonal view showing an attaching condition of a cap of the optical apparatus according to the first embodiment of the present invention.

As shown in FIGS. 3A and 4B, the protecting cap 21 covering one end of the protecting tube 20 is formed in a conical shape to form an open area 21a in the inside of the protecting cap 21. Also, a cable inserting hole 21b is formed in the top of the protecting cap 21. Also, a portion of the optical fiber cable 19 projecting from the ferrule 18 and an end portion of the ferrule 18 are accommodated in the open area 21a of the protecting cap 21.

Also, a small-diameter tube 21c is formed on the bottom side of the protecting cap 21, and a hook portion 21d tightly fit in the small windows 20f of the protecting tube 20 is formed on the end side of the mall-diameter tube 21c. A work for tightly fitting the protecting cap 21 in the protecting tube 20 is described.

The optical fiber cable 19 attached to the ferrule 18 is inserted into the cable inserting hole 21b of the protecting cap 21, and the protecting cap 21 is moved toward the protecting tube 20 along the optical fiber cable 19. Thereafter, the small-diameter tube 21c of the protecting cap 21 is pushed into the inside of the protecting tube 20 placed in the neighborhood of the ferrule 20. In this case, the hook portion 21d of the protecting cap 21 is slid on inclined planes of the nail portions 20e placed in the inside of the protecting tube 20, the hook portion 21d are pushed down under the inclined planes of the nail portions 20e, and the hook portion 21d are tightly fit in the small windows 20f of the protecting tube 20. Therefore, the movement of the protecting cap 21 and the rotation of the protecting cap 21 around the optical axis L of the optical apparatus 11 are forbidden by the co-operation of the nail portions 20e and the small windows 20f, and there is no case that the protecting cap 21 is detached from the protecting tube 20.

In the above configuration of the optical apparatus 11, any element does not exist between the protecting tube 20 and the base body 13a of the semiconductor package 13, but the open space 23 exists between the protecting tube 20 and the base body 13a of the semiconductor package 13. Also, the welding points, at which the protecting tube 20 and the package holder 14 are welded together, is close to the condensing lens 15 and is far from the device package 13. Therefore, when the flanges 20a of the protecting tube 20 are screwed on a ground plate (not shown), even though a stress is applied to one flange 20a, an adverse influence of the stress on the device package 13 is prevented because of the existence of the open space 23. Also, because the flanges 20a and the protecting tube 20 are made of a flexible material, it is difficult that the stress applied to the flange 20 influences on the body of the protecting tube 20.

Also, because the welding points, at which the protecting tube 20 and the package holder 14 are welded together, is close to the lens holder 16, even though the stress is applied to one flange 20, the deformation of the package holder 14 can be prevented.

Accordingly, the position of the device package 13 is not changed by the stress applied to the flange 20a, the optical axis of the optical semiconductor device 12 accommodated in the device package 13 does not shift from the optical axis L of the optical apparatus 11. Also, the position of the lens holder 16 is not changed by the stress applied to the flange 20a, the optical axis of the condensing lens 15 fixed in the lens holder 16 does not shift from the optical axis L of the optical apparatus 11.

Also, because the protecting tube 20 protecting the package holder 14, the lens holder 16 and the ferrule holder 17 is made of the metal, in cases where the optical fiber cable 19 is pushed in a lateral direction (or a radial direction) of the protecting tube 20 and a stress is applied to the protecting cap 21, though the protecting cap 21 is deformed, the protecting tube 20 made of the metal harder than the material of the protecting cap 21 is not deformed. Therefore, any stress directed in the lateral direction of the protecting tube 20 is not applied to the lens holder 14, the lens holder 16 or the ferrule holder 17. Accordingly, the optical axis of the condensing lens 15 does not shift from the optical axis L of the optical apparatus 11. Also, the optical axis of the ferrule 18 does not shift from the optical axis L of the optical apparatus 11.

Also, because the protecting cap 21 is made of the rubber or resin, the protecting cap 21 is flexible and elastic. Therefore, even though the optical fiber cable 19 is pushed in the radial direction of the protecting tube 20 and a stress is applied to the protecting cap 21, because the optical fiber cable 19 placed in the inside of the protecting cap 21 is curved in the radial direction, an stress applied to the optical fiber cable 19 is not concentrated to a portion of the optical fiber cable 19 placed at an inlet edge of the cable inserting hole 21b of the protecting cap 21. Accordingly, it becomes difficult that the optical fiber cable 19 is cut off at the inlet edge of the cable inserting hole 21b.

Figures 3A, 3B:
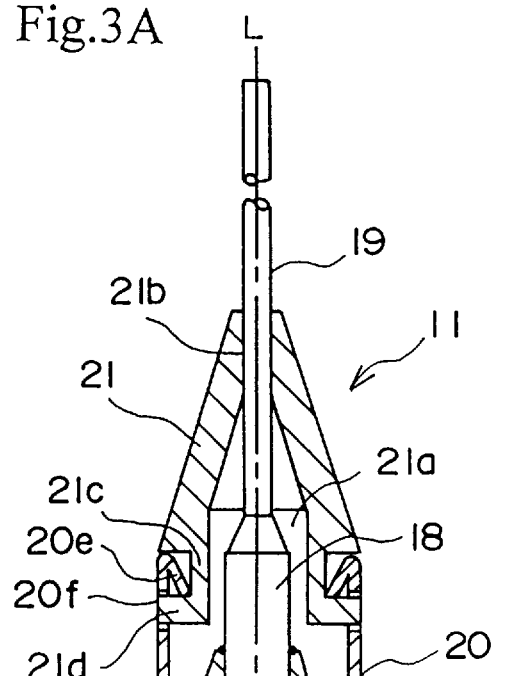
FIG. 3B is a side view of a connector attached to an end portion of an optical semiconductor device of the optical apparatus shown in FIG. 3A.

In this embodiment, as shown in FIG. 3A, it is assumed that any element is not attached to a portion of the optical fiber cable 19 projected from the optical apparatus 11. Therefore, the protecting tube 20 can be reliably set in the optical apparatus 11 while placing the optical fiber cable 19 in the inside of the protecting tube 20. Also, even though an element having an outside diameter smaller than an inside diameter of the protecting tube 20 is attached to a portion of the optical fiber cable 19 projected from the optical apparatus 11, the protecting tube 20 can be reliably set in the optical apparatus 11. However, as shown in FIG. 3B, in cases where a connector 24 having an outside diameter larger than an inside diameter of the protecting tube 20 is attached to a portion of the optical fiber cable 19 projected from the optical apparatus 11, the protecting tube 20 cannot be set in the optical apparatus 11. Therefore, the protecting tube 20 has a following structure according to a modification of the first embodiment in cases where the connecter 24 is attached to a portion of the optical fiber cable 19 projected from the optical apparatus 11.

Figure 5A:
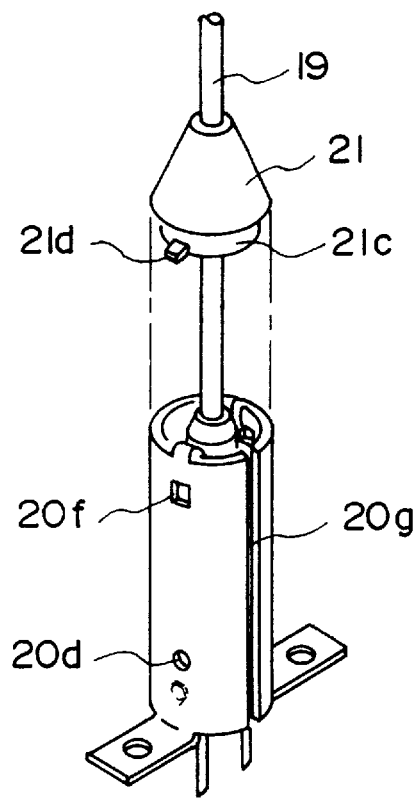
FIG. 5A is a diagonal view showing a joint-line space of the protecting tube of the optical apparatus according to the first embodiment of the present invention on condition that a space of the joint-line space is widened.

As shown in FIG. 5A, a width of the joint-line region 20g of the protecting tube 20 is set on condition that the width of the joint-line region 20g is larger than a diameter of the optical fiber cable 19. Therefore, the optical fiber cable 19 can be reliably put in the inside of the protecting tube 20 through the joint-line region 20g without disturbed by the connector 24. The width of the joint-line region 20g is, for example, set to 0.9 mm or more. Accordingly, the package holder 14, the lens holder 15 and the ferrule holder 17 fixed to each other can be reliably fit in the protecting tube 20.

Figure 5B:
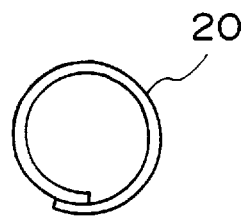
FIG. 5B is a top view of another protecting tube of the optical apparatus according to the first embodiment of the present invention on condition that both end portions of a metal plate making the protecting tube are overlapped with each other.

Also, in cases where the connector 24 is not attached to the optical fiber cable 19, it is applicable that a width of the joint-line region 20g of the protecting tube 20 be set to zero. Also, as shown in FIG. 5B, it is applicable that both sides of the processed plate 22 be overlapped with each other at a joint portion of the protecting tube 20. In this case, a diameter of the protecting tube 20 can be arbitrary selected.

Also, as shown in FIG. 4B, the shape of the processed plate 22 is determined on condition that the joint-line region 20g of the protecting tube 20 is placed out of a pair of positions placed above the flanges 20a. However, as is shown by a double-dot-dash-line in FIG. 4A, it is applicable that the shape of the processed plate 22 is determined on condition that the joint-line region 20g of the protecting tube 20 be placed just above a position placed on one flange 20a.
(Second embodiment)

Because the protecting tube 20 is formed by rolling up the rectangular portion 22a of the processed plate 22 in the first embodiment, when the joint-line region 20g of the protecting tube 20 is pushed by an external force, the inside diameter of the protecting tube 20 is easily changed. The protecting tube 20 is often pushed by an external force after the optical apparatus 11 is shipped. Therefore, in cases where the inside diameter of the protecting tube 20 is changed after the shipping of the optical apparatus 11, the package holder 14, the lens holder 15 or the ferrule holder 17 is warped, so that there is a probability that an optical axis of the optical semiconductor device 12, the condensing lens 15 or the optical fiber cable 19 shifts from the optical axis L of the optical apparatus 11.

To solve the above problem, there is a method that both sides of the processed plate 22 rolled up are welded together at the joint-line region 20g by the YAG laser welding or the resistance-welding. In this method, an appropriate width of the joint-line region 20g is 0.3 mm or less. However, in cases where the width of the joint-line region 20g is higher than 0.3 mm, it is difficult to weld both sides of the processed plate 22 rolled up.

Figure 6A:
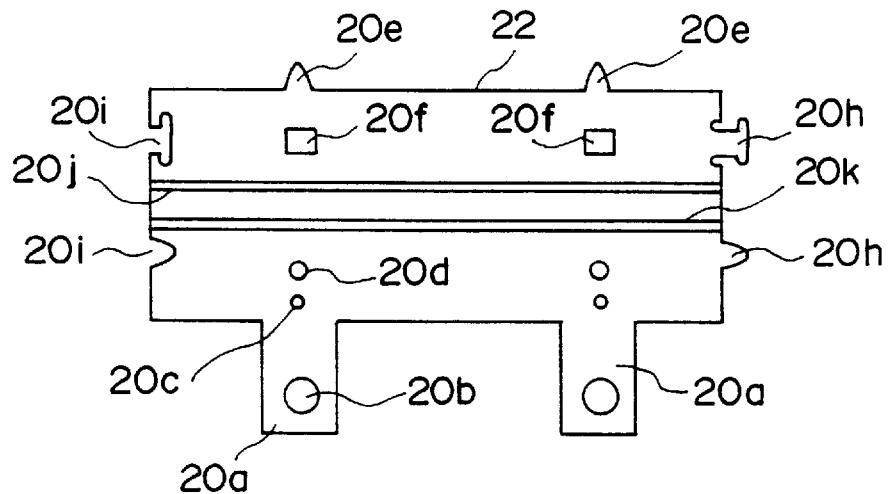
FIG. 6A is an expansion plan view of a protecting tube of an optical apparatus according to a second embodiment of the present invention.

In the second embodiment, as shown in FIG. 6A, a pair of tongue-like projecting portions 20h formed in a T shape (or an L shape) and a V shape (or a U shape) are arranged on a third side of the processed plate 22 on which either the flange 20a or the nail portion 20e is not arranged, and a pair of cut-out holes 20i formed in the same T shape (or the L shape) and the same V shape (or the U shape) are arranged on a fourth side of the processed plate 22 opposite to the third side on condition that the tongue-like projecting portions 20h can be fit in the cut-out holes 20i. In this case, a projecting length of one tongue-like projecting portion 20h is equal to or smaller than a cut depth of a corresponding cut-out hole 20i, and a projecting length of the other tongue-like projecting portion 20h is equal to or smaller than a cut depth of the other cut-out hole 20i.

Therefore, in cases where the processed plate 22 is rolled up so as to fit the tongue-like projecting portions 20h in the cut-out holes 20i, the protecting tube 20 can be obtained.

In cases where the optical fiber cable 19 is put in the inside of the protecting tube 20 through the joint-line region 20g, the tongue-like projecting portions 20h are bent toward the inside or outside of the protecting tube 20 before or after the processed plate 22 is rolled up. Therefore, the protecting tube 20 shown in FIG. 6B can be obtained, and the optical fiber cable 19 can be easily put in the inside of the protecting tube 20 through the joint-line region 20g without disturbed by the tongue-like projecting portions 20h. In this case, a projecting length of each tongue-like projecting portion 20h is smaller than a cut depth of a corresponding cut-out hole 20i. Thereafter, as shown in FIG. 3A, the convex portions 20c of the protecting tube 20 are tightly fit in the concave portions 14a of the package holder 14. Thereafter, as shown in FIG. 6C, the tongue-like projecting portions 20h are extended along a circumferential direction of the protecting tube 20 to fit the tongue-like projecting portions 20h in the cut-out holes 20i.

Accordingly, because the tongue-like projecting portions 20h formed in the T shape (or the L shape) and the V shape (or the U shape) are fit in the cut-out holes 20i formed in the same T shape (or the L shape) and the same V shape (or the U shape) across the joint-line region 20g of the protecting tube 20, even though the protecting tube 20 is pushed by an external force, the change of the joint-line region 20g can be prevented. For example, because the tongue-like projecting portion 20h formed in the T shape (or the L shape) is fit in the cut-out hole 20i formed in the same T shape (or the L shape), it is prevented that a width of the joint-line region 20g is narrowed or widened. Also, because the tongue-like projecting portion 20h formed in the V shape (or the U shape) is fit in the cut-out hole 20i formed in the same V shape (or the U shape), it is prevented that a width of the joint-line region 20g is narrowed.

Figure 6B:
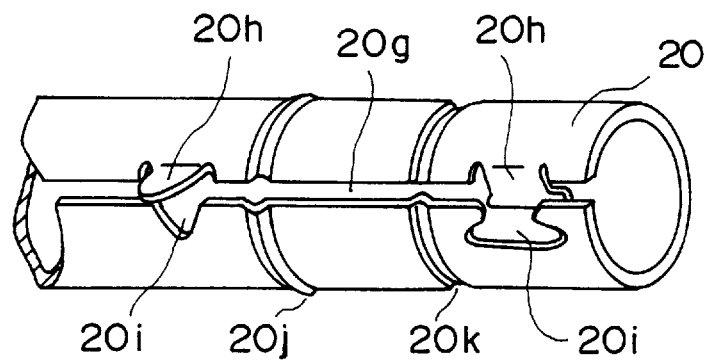
FIGS. 6B and 6C are respectively a diagonal view showing a procedure for assembling the protecting tube of the optical apparatus according to the second embodiment of the present invention.
Figure 6C:
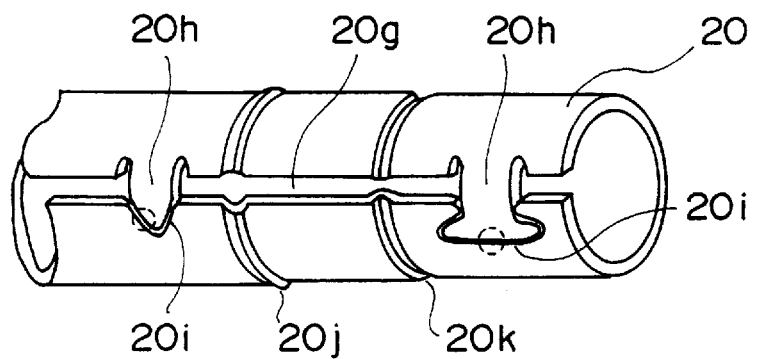

It is applicable that each tongue-like projecting portion 20h be welded to the corresponding cut-out hole 20i at a welding point shown by a dotted line in FIG. 6C.

Also, as shown in FIGS. 6A, 6B and 6C, in cases where a convex rib 20j or a concave rib 20k extending in a circumferential direction of the protecting tube 50 is formed in the protecting tube 20, the protecting tube 20 is mechanically reinforced, and the deformation of the protecting tube 20 caused by the external force can be moreover prevented.

The shape of the tongue-like projecting portion 20h is not limited to the T shape, the L shape, the V shape and the U shape, and the tongue-like projecting portion 20h having an arbitrary shape can be useful on condition that the diameter of the protecting tube 20 is maintained even though the protecting tube 20 is pushed by an external force.

In the second embodiment, a constitutional element shown in FIG. 6A which is identical with a constitutional element shown in FIG. 4A is indicated by the same reference sign as that indicating the constitutional element shown in FIG. 4A.

(Third embodiment)

In the first and second embodiments, the single processed plate 22 is rolled up to form the protecting tube 20. However, the number of processed plates is not limited to one.

In the third embodiment, the processed plate 22 is divided into two pieces along a dot-dash line shown in FIG. 7A, and the protecting tube 20 is formed out of two divided processed plates.

In detail, as shown in FIG. 7B, each of two processed plates is bent in a semi-cylindrical shape, and a first semi-cylindrical protecting tube 20x and a second semi-cylindrical protecting tube 20y are formed. Thereafter, as shown in FIG. 7A, the package holder 14, the lens holder 16 and the ferrule holder 17 fixed to each other are tightly set between the first and second semi-cylindrical protecting tubes 20x and 20y, and each pair of side ends of the first and second semi-cylindrical protecting tubes 20x and 20y facing each other are welded together at a plurality of welding points by a YAG laser light radiation welding or a resistance welding. Therefore, the first and second semi-cylindrical protecting tubes 20x and 20y are fixed to each other, and the protecting tube 20 shown in FIG. 3A is formed. Each of the welding points is indicated by a black point in FIG. 7A.

Therefore, because the first and second semi-cylindrical protecting tubes 20x and 20y are fixed to each other after the package holder 14, the lens holder 16 and the ferrule holder 17 fixed to each other are tightly set between the first and second semi-cylindrical protecting tubes 20x and 20y, even though the connector 24 is attached to the optical fiber cable 19, the protecting tube 20 can be easily attached to the package holder 14, the lens holder 16 and the ferrule holder 17.

In the third embodiment, a constitutional element shown in FIG. 7A which is identical with a constitutional element shown in FIG. 3A is indicated by the same reference sign as that indicating the constitutional element shown in FIG. 3A.

What is claimed is:

1. An optical apparatus, comprising:
    a ferrule holder in which a ferrule connected with an end of an optical fiber cable is held;
    a lens holder in which a lens is held, the lens holder being fixed to the ferrule holder;
    a package holder in which an optical semiconductor device package having an optical semiconductor device is held, the package holder being fixed to the lens holder
    a protecting tube which is formed by rolling up a metal plate to have a joint line extending in a height direction and is arranged around the ferrule holder, the lens holder and the package holder;
    a flange which is formed by bending a flange portion projected from the metal plate toward an outer direction of the protecting tube;
    a hole arranged in the flange; and
    a cap made of rubber or resin for covering one end of the protecting tube, the optical fiber cable passing through a cable inserting hole of the cap.

2. An optical apparatus according to claim 1, wherein a portion of the protecting tube close to the flange faces a base body of the optical semiconductor device package through an open space.

3. An optical apparatus according to claim 1, wherein the package holder is welded to the protecting tube at a welding point, the welding point being placed at a position approaching the optical fiber cable from the optical semiconductor device package.

4. An optical apparatus according to claim 3, wherein a hole is arranged in the protecting tube, and the welding point is placed in the hole.

5. An optical apparatus according to claim 1, wherein the package holder has a concave portion in its outer surface, the protecting tube has a convex portion on its inner surface, and the convex portion of the protecting tube being fit in the concave portion of the package holder.

6. An optical apparatus according to claim 1, wherein the protecting tube has a window, and the cap has a convex portion which is fit in the window of the protecting tube through the inside of the protecting tube.

7. An optical apparatus according to claim 6, wherein a nail portion projecting into the inside of the protecting tube is arranged on one end side of the protecting tube to lead the convex portion of the cap in the window of the protecting tube and to prevent the detaching of the cap from the protecting tube.

8. An optical apparatus according to claim 1, wherein the joint line of the protecting tube has an open space through which the optical fiber cable is inserted.

9. An optical apparatus according to claim 1, wherein the joint line of the protecting tube has no open space or both ends of the metal plate are overlapped with each other at the joint line of the protecting tube.

10. An optical apparatus according to claim 1, wherein a tongue-like projecting portion arranged on one side of the metal plate is fit in a cut-out hole arranged on the other side of the metal plate at the joint line of the protecting tube.

11. An optical apparatus according to claim 1, wherein both ends of the metal plate at the joint line of the protecting tube are welded together at a plurality of welding points.

* * * * *